July 19, 1960 G. F. BOLLERT ET AL 2,945,992

SEMI-CONDUCTOR DEVICE

Filed March 16, 1959

INVENTORS:

GERHARD FRITZ BOLLERT, WALTER OTTO RAMSER + DIETRICH WIELAND

By Burgess, Dinklage & Sprung

ATTORNEYS

United States Patent Office 2,945,992

Patented July 19, 1960

2,945,992

SEMI-CONDUCTOR DEVICE

Gerhard Fritz Bollert, Walter Otto Ramser, and Dietrich Wieland, all of Nurnberg, Germany, assignors to Eberle & Kohler, Nurnberg, Germany, a corporation of Germany Filed Mar. 16, 1959, Ser. No. 799,561

Claims priority, application Germany Mar. 18, 1958

17 Claims. (Cl. 317—234)

This invention relates to semi-conductor devices with a semi-conducting body, for instance diodes or transistors, and more particularly to such devices which are hermetically sealed in a housing generally consisting of a base and a cap.

It is known that semi-conductors can be sealed hermetically by means of a cap. This cap is usually tubular and is connected at one end onto the base of the device. The other end is provided with a glass seal through which a hermetically sealed terminal shaft extends into the cap.

In making a proper hermetic seal as well as in effecting an electrical contact between the outside contact terminal and the semi-conducting body within the housing, difficulties arise during manufacture. The contact connection fixed to the semi-conductor body, for instance aluminum wire, is joined with the outside terminal after passing through the hermetically sealed terminal shaft. A danger arises in this respect because the additament used for soldering the contact connection on to the shaft penetrates immediately or during the tempering thereafter back through the shaft and into the cavity between the cap and the base. This soldering substance, as a result, renders the semi-conductor material impure. A further disadvantage in this way of sealing is the poor elimination of heat arising during operation of the device. During such operation of the semi-conductor, the generated heat causes an expansion of the cap which may interrupt the rigid sealed connection between the semi-conductor and the base, and conversely upon cooling may upset the connection.

Figure 1:
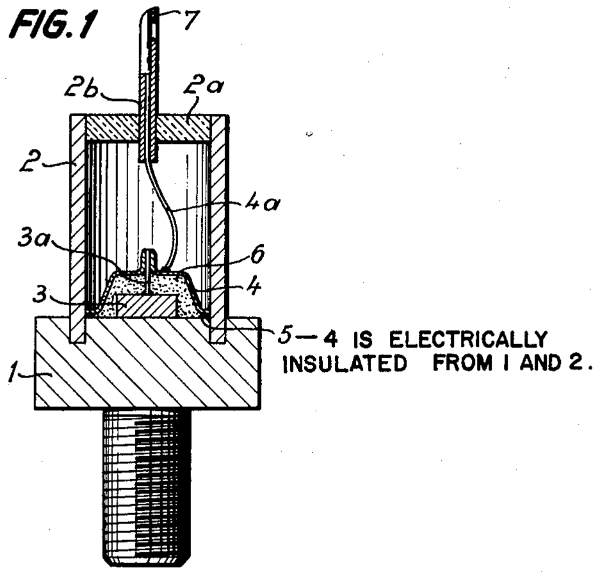
Figure 2:
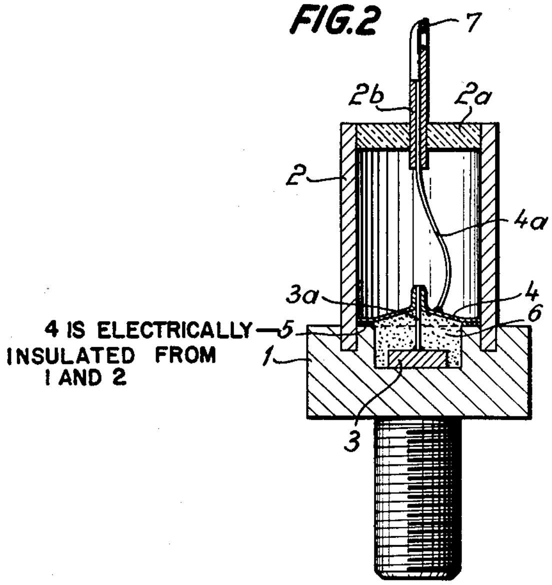

It is, therefore, an object of the present invention to overcome the foregoing drawbacks and to provide a semi-conductor device which is protected from damage and contamination and which permits efficient dissipation of heat generated during operation of the device. Other and further objects will become apparent from the within specification and accompanying drawing in which;

Fig. 1 is a view partially in section of an embodiment of a semi-conductor device in accordance with the invention and, Fig. 2 is a view similar to that in Fig. 1 of a further embodiment in accordance with the invention.

In accordance with the present invention, it has been found that by providing an intermediate protective cap hooded over the body of semi-conductor material, which is insulatedly connected to the base and electrically connected to the electrode of the semi-conductor material, the above-mentioned faults may be eliminated. Accordingly, by further providing a flexible connection from said intermediate cap to the outside terminal connection, heat of expansion during operation will not affect the hermetic condition of the device.

Referring to Fig. 1 of the drawing, 1 is a base, 2 is a cap hermetically sealed to the base of the device, 2$a$ is a cap cover made of insulating material, and 2$b$ is a hermetically sealed terminal shaft. 3 is the body of semi-conducting material, 3$a$ is the electrode therefor, 4 is the metallic intermediate cap, and 4$a$ is the flexible connection. 5 is a layer of insulating material, such as mica, steatite or other similar material. The intermediate cap may be even anodized. 7 is the outside connection terminal.

Intermediate cap 4 is insulatedly connected to the base 1, for instance, by being cemented or pasted together, and the interior of intermediate cap 4 is filled with a mass of silicon 6 or similar material which is enriched for instance by aluminum oxide to insure good dissipation of heat in order to prevent damage to the rectifying junctions. The filler material 6 placed between the intermediate cap 4 and the semi-conductor body 3 can also consist of a suspension, lac, grease or other similar material. The electrode 3$a$ of the semi-conducting material passes through an opening of the intermediate cap and is welded thereto. The connection to the hermetically sealed terminal shaft 2$b$ is made by flexible wire 4$a$ which is fixed to the surface of the intermediate cap 4. The connection of the wire 4$a$ with the intermediate cap 4 can be made by welding, soldering, pasting or by similar means. The wire 4$a$ is sealed in the channel of the terminal 2$b$ preferably by squeezing the channel and soldering the wire to it. The material for the flexible connection 4$a$, the intermediate cap 4, and the connection 7 is preferably copper although other suitable materials may also be used. Besides copper, aluminum or similar material may be used. It is not necessary that the intermediate cap 4, the wire 4$a$ and the sealed terminal 4$b$ be made from the same metal. Aluminum, brass, lead, Pt or other metals can be used.

Figure 2 shows a variation of the device above described. The semi-conductor body in this variation is situated in a fissure or recess of the base 1. Accordingly, the metallic intermediate cap 4 is fixed to the borders of the fissure for insulated connection with base 1.

By employing the foregoing construction in accordance with the present invention, including intermediate cap 4, the semi-conductor body materails are protected against damage and chemical contamination. By means of the intermediate cap 4 and material 6, the efficient dissipation of the generated heat is further achieved. The flexible connection 4$a$ between the body of semi-conductor material 3 and the cap 2, as well as the outside terminal connection 7, permits expansion to occur during normal operation without disrupting the sealed condition of the device. By the use of copper or other suitable metallic material for the intermediate cap 4, as well as for the flexible connection 4$a$ and the outside terminal connection 7, the difficulties of connecting the electrode 3$a$ of the semi-conductor to the connection 7 are easily overcome. Since the connection between the intermediate cap 4 and the connection 7 consists of the same material, no soldering problems arise. Nevertheless, the intermediate cap must still be hermetically sealed for proper operation.

What is claimed is:

1. A semi-conductor device comprising a hermetically sealed means defining a housing having a base means and a first cap means, said first cap means being hermetically sealed to said base means, a semi-conductor body, having an electrode means, disposed in said housing means, an electrically conductive intermediate second cap means disposed over said semi-conductor body and electrically insulatedly fixed to said base means and electrically connected to said electrode means, and means for conduction of electricity from said intermediate second cap means through said first cap means to the exterior of said hermetically sealed housing means.

2. A semi-conductor device comprising a hermetically sealed means defining a housing having a base means and a first cap means, said first cap means being hermetically sealed to said base means, a semi-conductor body including an electrode means thereon, said body and said electrode means being disposed in said housing means, an electrically conductive intermediate second cap means covering said body and said electrode means and electrically insulatedly fixed to said base means and electrically connected to said electrode means, an exterior electrical terminal connection disposed on said first cap means, and means for conducting electricity from said intermediate second cap means through said first cap means to said exterior electrical terminal connection, said means for conducting electricity through said first cap means passing therethrough under hermetically sealed condition.

3. A semi-conductor device according to claim 1 wherein an insulating filler material is disposed between said intermediate second cap means and said semi-conductor body, said material being capable of dissipating heat generated during operation of said device.

4. A semi-conductor device according to claim 3 wherein said filler material is a mixture of silicon and aluminum oxide.

5. A semi-conductor device according to claim 1, wherein said means for conducting electricity from said intermediate second cap means through said first cap means is a flexible electrically conductive wire means.

6. A semi-conductor device according to claim 1 wherein said means for conducting electricity is fixedly connected at one end to the surface of said intermediate second cap means and is hermetically connected through said first cap means to the exterior of said hermetically sealed housing means.

7. A semi-conductor device according to claim 5 wherein the intermediate second cap means and the flexible wire means are made of easily solderable heat dissipating material.

8. A semi-conductor device according to claim 7 wherein said material is copper.

9. A semi-conductor device according to claim 1 wherein the intermediate second cap means is electrically insulated from said base means by a layer of electrically insulating material disposed therebetween.

10. A semi-conductor device according to claim 9 wherein said material is mica.

11. A semi-conductor device according to claim 9 wherein said material is steatite.

12. A semi-conductor device according to claim 9 wherein said material is aluminum oxide.

13. A semi-conductor device according to claim 1 wherein said intermediate second cap means is anodized.

14. A semi-conductor device according to claim 1 wherein said semi-conductor body is disposed on the inside surface of said base means.

15. A semi-conductor device according to claim 1 wherein said semi-conductor body is disposed in a recess in the inside surface of said base means.

16. A semi-conductor device comprising a housing means including a base means and a tubular cap means hermetically sealed at one end to said base means, the other end of said cap means having a cover portion hermetically sealed thereacross, a terminal shaft extending through said other end cover portion and being in hermetically sealed condition with respect to said cover portion, a semi-conductor body including an electrode means thereon, said semi-conductor body and said electrode means being disposed in said housing means and adjacent a portion of the inside surface of said base means, a layer of electrically insulating material disposed on the inside surface of said base means and adjacent said body, an electrically conductive intermediate cap means disposed over said body and said electrode means and abutting said layer of insulating material, said intermediate cap means being fixed to said base means and being electrically insulated by said layer of material from said base means, said intermediate cap means being electrically connected to said electrode means, an insulating filler material disposed between said intermediate cap means and said semi-conductor body, said material being capable of dissipating heat generated during operation of said device, and a flexible electrically conductive means connected at one end to said intermediate cap means and at the other to a portion of said terminal shaft in hermetically sealed condition, a portion of said terminal shaft extending outwardly from said cover portion and being provided with an electrical terminal connection means.

17. In a semi-conductor body having a hermetically sealed housing with a semi-conductor body positioned therein the improvement which comprises first electrical connection means connected to one side of said semi-conductor body and second electrical connection means connected to the other side of said semi-conductor body and extending through the wall of said housing, an electrically conductive intermediate cover means positioned in spaced relationship to said semi-conductor body and sealing said body from the portion of the housing through which said second connection means extends, said cover means being electrically connected to said second connection means and electrically insulated from said first connection means.

References Cited in the file of this patent

UNITED STATES PATENTS

| | | |
|---|---|---|
| 2,861,226 | Lootens | Nov. 18, 1958 |
| 2,892,135 | Woods | June 23, 1959 |